United States Patent
Redding et al.

(10) Patent No.: US 6,763,853 B1
(45) Date of Patent: Jul. 20, 2004

(54) LIGHTWEIGHT CONDUIT

(75) Inventors: Jesse Cliff Redding, Asheboro, NC (US); Larry Lionel Bunting, Asheboro, NC (US)

(73) Assignee: RSB Pipe Corporation, Inc., Asheboro, NC (US)

( * ) Notice: Subject to any disclaimer, the term of this patent is extended or adjusted under 35 U.S.C. 154(b) by 174 days.

(21) Appl. No.: 10/087,285

(22) Filed: Mar. 1, 2002

(51) Int. Cl.$^7$ .................................................. F16L 9/00
(52) U.S. Cl. ........................ 138/157; 138/137; 138/170; 138/141; 138/177; 428/36.5
(58) Field of Search ..................... 138/114, 157, 138/149, 177, 178, 170, 137, 145, 146, 160, 140, 141; 428/35.9, 36.5, 35.7

(56) References Cited

U.S. PATENT DOCUMENTS

| | | | |
|---|---|---|---|
| 3,095,014 A | | 6/1963 | Dosker ........................ 138/151 |
| 3,095,337 A | * | 6/1963 | Chase ......................... 138/155 |
| 3,126,035 A | * | 3/1964 | Espetvedt ................... 138/162 |
| 3,614,967 A | | 10/1971 | Royston ...................... 138/141 |
| 3,628,572 A | * | 12/1971 | Shannon ...................... 439/61 |
| 3,665,968 A | | 5/1972 | De Putter ................... 138/141 |
| 3,731,710 A | | 5/1973 | Bauer et al. ................ 138/143 |
| 4,122,203 A | * | 10/1978 | Stahl ....................... 428/318.4 |
| 4,298,554 A | * | 11/1981 | Vogel et al. ................ 264/432 |
| 4,713,271 A | | 12/1987 | Searl et al. ................... 428/36 |
| 4,874,648 A | * | 10/1989 | Hill et al. .................. 428/35.9 |
| 5,298,299 A | * | 3/1994 | Shea ......................... 428/34.5 |
| 5,383,994 A | * | 1/1995 | Shea ......................... 156/175 |
| 5,411,777 A | * | 5/1995 | Steele et al. ............... 428/34.9 |
| 5,534,337 A | * | 7/1996 | Bailey, Jr. .................. 428/301.4 |
| 5,688,600 A | * | 11/1997 | Bailey, Jr. ................... 428/421 |
| 5,795,634 A | | 8/1998 | Fukui ......................... 428/36.1 |
| 5,918,644 A | | 7/1999 | Haack et al. ................ 138/151 |
| 5,944,060 A | | 8/1999 | MacKay ..................... 138/140 |
| 5,947,158 A | | 9/1999 | Gross et al. ................. 138/149 |
| 5,971,034 A | | 10/1999 | Heisey et al. ............... 138/149 |

OTHER PUBLICATIONS

Dow Plastics Fabricating Tips, Derakane epoxy vinyl ester resins brochure, The Dow Chemical Company, Jan. 1996.
Derakane 470 series epoxy vinyl ester resins, Dow Plastics Derakane Epoxy Vinyl ester Resins brochure, The Dow Chemical Company, pp. 6–8, Mar. 1996.
Dow Trymer Pipe Insulation, Your Guide to Features, Installation and Use brochure, The Dow Chemical Company, Aug. 1997.

* cited by examiner

*Primary Examiner*—Patrick Brinson
(74) *Attorney, Agent, or Firm*—Womble Carlyle Sandridge & Rice, PLLC

(57) ABSTRACT

A lightweight conduit for fluid conveyance, having an outer conduit portion formed of rigid insulation material, an inner conduit portion formed of rigid insulation material, the inner conduit portion having an outer surface and an inner surface and first and second ends, the inner and outer conduit portions being aligned and adhered together so that one end of the inner conduit portion protrudes outwardly beyond the corresponding end of the outer conduit portion, and the second end of the inner conduit portion is recessed into the second end of the outer conduit portion, and a resin coating is applied over the outer surface of the outer conduit portion and over the inner surface of the inner conduit portion so that the lightweight conduit is both corrosion-resistant and flame-resistant.

33 Claims, 6 Drawing Sheets

LIGHTWEIGHT CONDUIT

FIELD OF THE INVENTION

The present invention relates generally to pipe and ductwork for commercial applications, and, more particularly, to a lightweight corrosion-resistant and flame-retardant conduit for fluid (liquid and air) conveyance.

BACKGROUND OF THE INVENTION

Non-pressurized fluid conduits have been developed for countless applications over the years as the mechanical, structural, and materials arts have progressed in response to industrial growth and technological change. Most materials have been selected based upon both their suitability for a particular application, and their relative costs when compared to other suitable materials. For example, galvanized steel pipe and concrete have been the materials of choice for many years for subsurface, non-pressurized drainage and conveyance. While relatively inexpensive and especially suitable to these applications because of their corrosion-resistance, these materials are extremely heavy and bulky, thus requiring installation by mechanical contractors using heavy equipment. For instance, a 10 inch, Schedule 40 galvanized steel pipe will weight approximately 40 pounds per linear foot, and individual pipe sections are typically more than 10 feet long. The resulting labor costs are high and the time required to complete the tedious installation is therefore extensive. The added precautions necessary to safeguard workers from injury when handling such massive structures also increase costs and assembly time.

Above surface fluid conduits have also been problematic. Air circulating systems, including air ducts, supply relatively low pressure forced air heating and cooling in residential, commercial, and industrial applications. In commercial and industrial applications, the air ducts, which are conventionally formed of heavy sheet metal, must be suspended from structural load-bearing members using supporting hardware, or "hangers." While sheet metal is lighter than concrete or galvanized steel, suspended installation is also laborious and requires special hoists or other lifting devices to position the duct sections and hold them in place while they are interconnected and supported. Further, overhead insulated ductwork has its own special problems, especially with leaking condensation from overhead chilled water piping saturating the fiberglass, or other insulation material surrounding the ductwork. Such leakage also produces chemical reactions of the binder that holds the fiberglass together to produce phenol and formaldehyde, both occupationally undesirable. While lighter, composite, insulated conduit systems would be desirable, none have been known that provide acceptable corrosion resistance or ability to meet recognized flame-retardance testing, or are safe to occupants during known or anticipated operating conditions or failures.

In addition to installing the subsurface or above surface conduits described above, fluid conduits normally must be insulated and sealed to minimize thermal losses, conceal hot surfaces, or block moisture penetration. Typically, an insulation contractor performs this necessary second step. Lastly, the insulated conduits are covered with a jacket or vapor barrier. The total installation process must therefore be accomplished in the field in three steps. Unfortunately, poor materials, less than ideal field conditions, and workmanship often lead to hazardous conditions, undue maintenance, and premature replacement of conduits.

SUMMARY OF THE INVENTION

The present invention relates, in part, to a lightweight, corrosion-resistant and flame-retardant conduit that addresses the problems described above for non-pressurized fluid conveyance.

In a preferred embodiment, a lightweight corrosion-resistant conduit for fluid conveyance comprises an outer conduit portion and an inner conduit portion. The outer conduit portion is formed of a rigid foam material and has an outer surface and an inner surface, and first and second ends. The inner conduit portion is formed of the same foam material and has an outer surface and an inner surface and first and second ends. The outer surface of the inner conduit portion substantially conforms to the inner surface of the outer conduit portion. The inner and outer conduit portions are aligned and adhered together such that the first end of the inner conduit portion protrudes outwardly beyond the first end of the outer conduit portion to form a male end, and the second end of the inner conduit portion is recessed into the second end of the outer conduit portion to form a female end.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

DESCRIPTION OF THE PREFERRED EMBODIMENTS

The present invention is directed to a lightweight, corrosion-resistant and flame-retardant conduit for use in non-pressurized fluid conveyance applications. As used herein, "fluid" refers to either liquid or gaseous matter.

Figure 1:
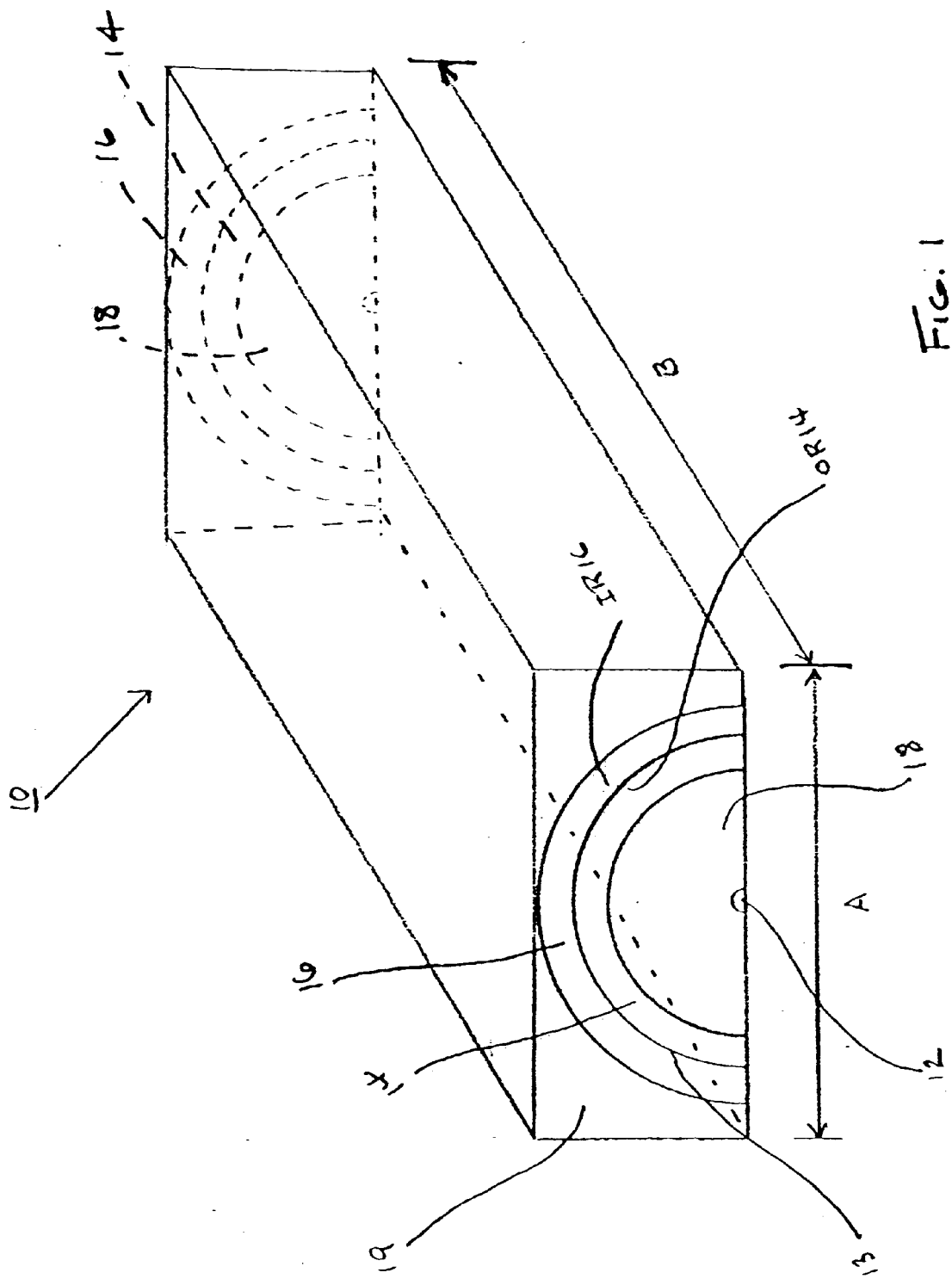
FIG. 1 is front perspective view illustrating how the conduit portions of the present invention are formed.

As shown in FIG. 1, the process of forming the lightweight conduit of the present invention begins with cutting conduit sections from large blocks of rigid foam insulation. Since the cut foam sections themselves will form the conduit portions, as well as the standard wall thickness of the conduit, factors such as weight (density), structural rigidity, porosity, and degree of insulation are important. For the present invention, it has been found that several materials are well suited for a conduit construction to be used in low-pressure applications. ("Low-pressure" as used herein refers to conditions whereby the pressure within the conduit during a given operation is less than about 5 to 10 psig.) Some commercially available materials that are suitable for the present invention include expanded polystyrene, extruded polystyrene, polyisocyanurate foam, polyurethane foam, and phenolic foams. Those skilled in the materials arts will appreciate that other lightweight rigid materials such as plastics, polymers, or other natural or synthetic materials may be substituted. While each of these is suitable for the purposes described herein, a polyisocyanurate foam made by Duna USA, Inc. in Wooster, Ohio is a preferred material. This polyisocyanurate has a density of about 2 pounds per cubic foot. This polyisocyanurate, as well as the other insulation materials described above, are commonly purchased in large blocks, also commonly referred to as billets or buns, in sizes of 24"×36"×48" and 10"×20"×36". The range of generally available block sizes makes it possible to fabricate conduits having 6 to 40 inch nominal outside diameters (OD).

In a first embodiment of the present invention, 180 degree semi-circular sections are cut from these lightweight billets. A conventional band saw mounted on a cutting platform is used to cut the sections from the block. As those skilled in the art will appreciate, various cutters/saws may be readily employed to cut the insulation into the desired geometries. Referring again to FIG. 1, a block of lightweight rigid foam insulation material is shown generally as 10. Dimension A represents the width of the block, which must be at least as great as the outside diameter to be cut from the block. Dimension B represents the total length of the conduit to be so formed. In the cutting operation, the block is rotated about its long axis (through point 12), while semi-circular portions 14, which will form the inner portion of the conduit, and 16, which will form the outer portion of the conduit, are cut from the block. As shown in the figure, the inner radius (surface) of the outer portion 16 corresponds generally to the outer radius (surface) of inner portion 14. Portions 18 and 19 are either discarded or used for other, smaller diameter applications. As will be appreciated, the width of the saw blade displaces and removes a circumferential volume between the inner and outer portions of approximately 1/16 inch, shown as radius 13. This means that when placed one inside the other, the inner radius of the outer portion 16 is about 1/16 inch greater than the outer radius of inner portion 14. By "inner radius" is meant the radius of the conduit section as measured from the center to the inside wall; similarly, the "outer radius" is measured from the center to the outside wall.

Figure 3:
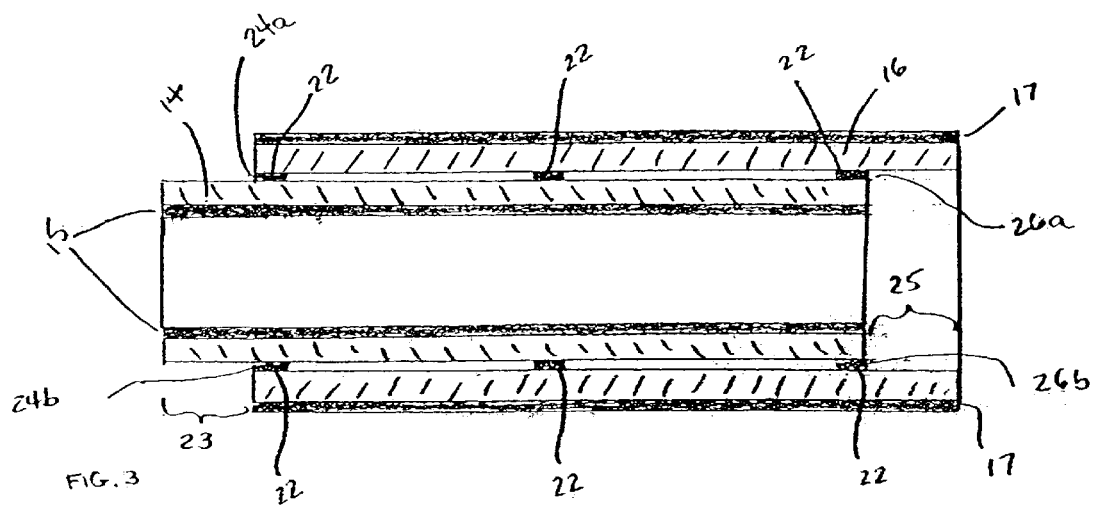
FIG. 3 is a cross-sectional view of the lightweight conduit of FIG. 1 taken along Line 3—3.
Figure 4:
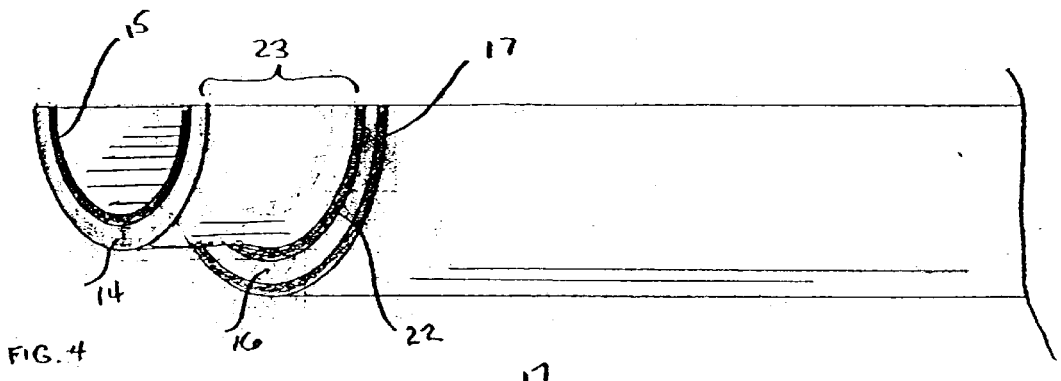
FIG. 4 is a side perspective sectional view of the conduit of the cross-section depicted in FIG. 3.

Once the inner and outer conduit sections are cut from the block, a conduit half is ready to be assembled. FIGS. 3 and 4 illustrate the assembly and configuration of each conduit half section. FIG. 3 shows a top view of an upwardly facing conduit half, and FIG. 4 is a side perspective view of a conduit half that is formed according to the present invention. The inner portion 14 is then seated within the outer portion 16. Because a gap of approximately 1/16 inch (or difference between the inner radius of outer portion, IR16, and the outer radius of the inner portion, OR14) has been created by the cutting process, the inner radius of outer portion 16 must be built-up for proper alignment with inner portion 14 so that the cross sections of the walls are substantially coplanar. It has been found that this is best accomplished by applying a 1/16 to 1/8 inch bead or strip of adhesive 22 intermittently along the inner portion 16, including the abrupt juncture points 24a, 24b and 26a, 26b between the inner 14 and outer 16 portions.

Applying the adhesive at these points ensures not only that the portions are properly aligned, but also that the conduit lengths are sealed at each end from penetration by moisture or foreign matter during field installation.

Figure 6:
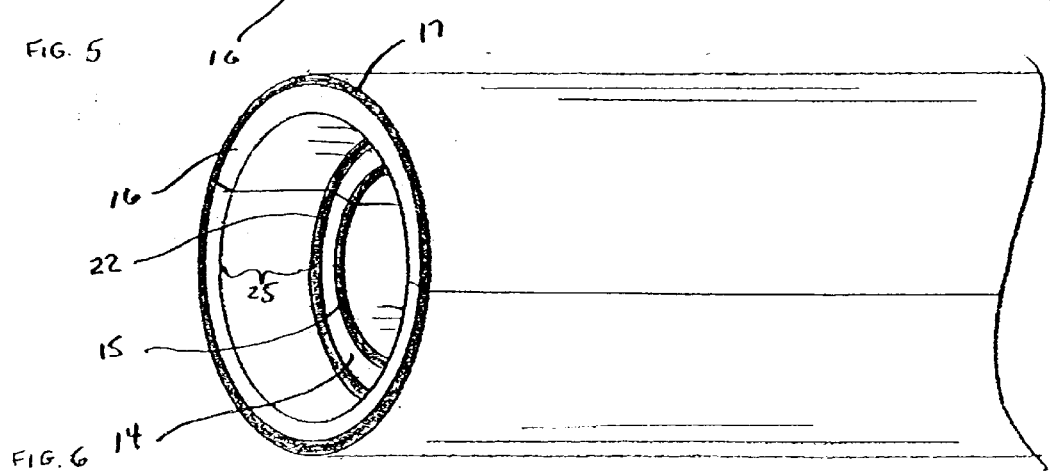
FIG. 6 is a side perspective view of the assembled conduit according to the present invention, illustrating the female end of the conduit.

As shown in FIGS. 3 and 4, inner portion 14 is positioned to protrude outwardly from outer portion 16 on one end to form a male extension 23, also known in the art as a "shiplap". When the portions are positioned relative to one another in this manner, a recessed or female coupling 25 is formed at the opposite end (FIG. 6). The length of the shiplap extensions or recesses is dependent upon the nominal diameter of the pipe. In the way of examples, a 1–2 inch pipe typically requires a 2 inch extension, a 3–6 inch pipe uses a 3 inch extension, an 8–12 inch pipe uses a 4 inch extension, etc. as is known in the art.

The adhesive used to form the built-up strips preferably is an epoxy vinyl ester resin. One suitable epoxy vinyl ester resin manufactured by Interplastic Corporation as VE-8301 is particularly corrosion-resistant and chemical resistant, has good retention and strength at elevated temperatures, and cures in a relatively short time. According to Interplastic representations, this resin coating also provides a high degree of fire-retardance, when tested in accordance with the American Society for Testing and Materials (ASTM) Standard E-84, "Standard Test Method for Surface Burning Characteristics of Building Materials".

Having attached the inner and outer portions of a conduit half, the same vinyl ester resin can be applied to the inner surface of inner portion 14 in a continuous layer 15 that is nominally 1/16 inch thick. Although this inner layer 15 of coating could be applied post-assembly of the conduit, it is most easily applied to the exposed inner surface of the conduit half. This inner layer 15 provides both corrosion resistance and prevents moisture/liquid migration through the walls of the conduit. While polyisocyanurate has about a 97% closed cell foam construction, the vinyl ester resin layer 15 substantially closes the construction, minimizing moisture migration and corrosive intrusion through the conduit walls.

Figure 5:
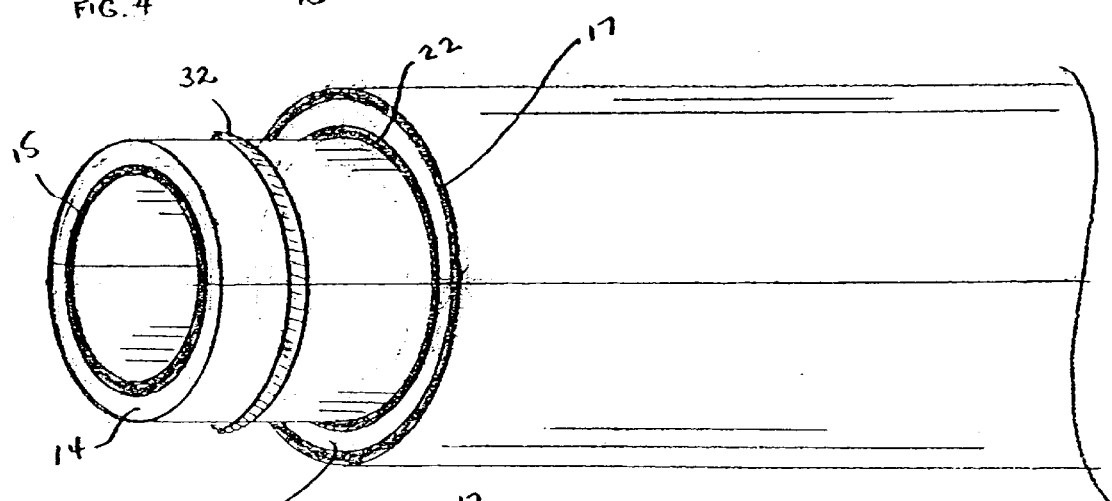
FIG. 5 is a side perspective view of an assembled conduit according to the present invention, illustrating the male end of the conduit.

Once the inner coating 15 on the inner surface of inner portion 14 has cured, which can be up to about 1 hour depending upon the thickness of the resin and the ambient temperature, two identical conduit halves are aligned and adhered together. FIG. 5 shows the male end of a complete conduit assembly with the two halves sealed together. It has been found that the best results are obtained when a strip, or bead, of the vinyl acrylic resin is applied only along the wall thicknesses of the inner conduit portions 14. The resin is applied by brushing, spraying, or other suitable means. In a preferred embodiment, the exposed wall thicknesses on each conduit half are sealed together, but the wall thicknesses of the outer conduit portions 16 are not sealed at this point. This prevents the formation of a conductive path between the inner 14 and outer 16 conduit portions. Preferably, a bead about 1/8 inch thick provides an adequate seal. When sealed together, the two inner portions 14 actually form the fluid conveying pipe of the conduit.

When the vinyl ester resin has cured, and the two inner halves are joined, an outer coating 17 of vinyl ester resin is applied over the entire exposed surface of the outer conduit portions 16, and cured. The outer coating is also approximately 1/16 inches thick and serves as both a moisture barrier and a flame-retardant layer. When applied, outer coating 17 penetrates and fills the joints between the two outer conduit portions.

Figure 2:
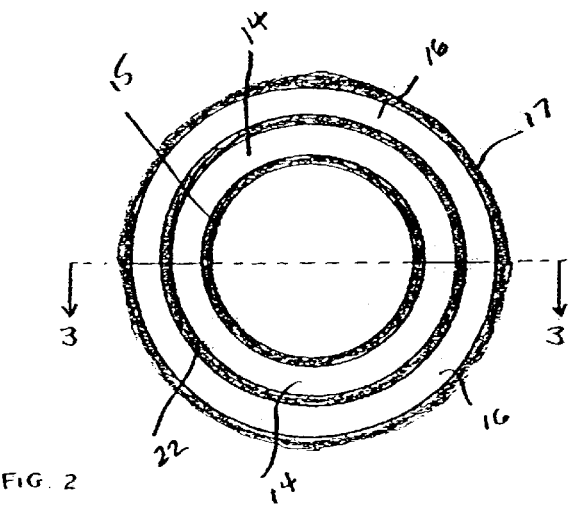
FIG. 2 is an end view of a lightweight conduit formed according to the present invention.

FIGS. 5 and 6 best illustrate complete conduit assemblies constructed according to the present invention. FIG. 5 is illustrative of a conduit male end showing the shiplap described above, and FIG. 6 illustrates the corresponding conduit female end. Returning to FIG. 2, an end view of the completed conduit is shown to illustrate the various layers of a complete, circular conduit.

With respect to adjoining two conduits, those skilled in the art will appreciate that there are numerous ways to ensure a seal between the adjoined conduits. A preferred way of forming this seal is by positioning a butyl rubber, or other suitable resilient material, gasket 32 around the periphery of that inner conduit portion 14 forming the male extension 23 (see FIG. 5). To hold the gasket in place during the joinder of two conduits, the gasket is tacked to the outer surface of the inner portion 14 with any suitable adhesive. For a conduit construction of the type described herein, the gasket should have a Shore hardness of between about 60 and 70 and an installed thickness (before joinder) of about 1/16 inch.

Figure 7:
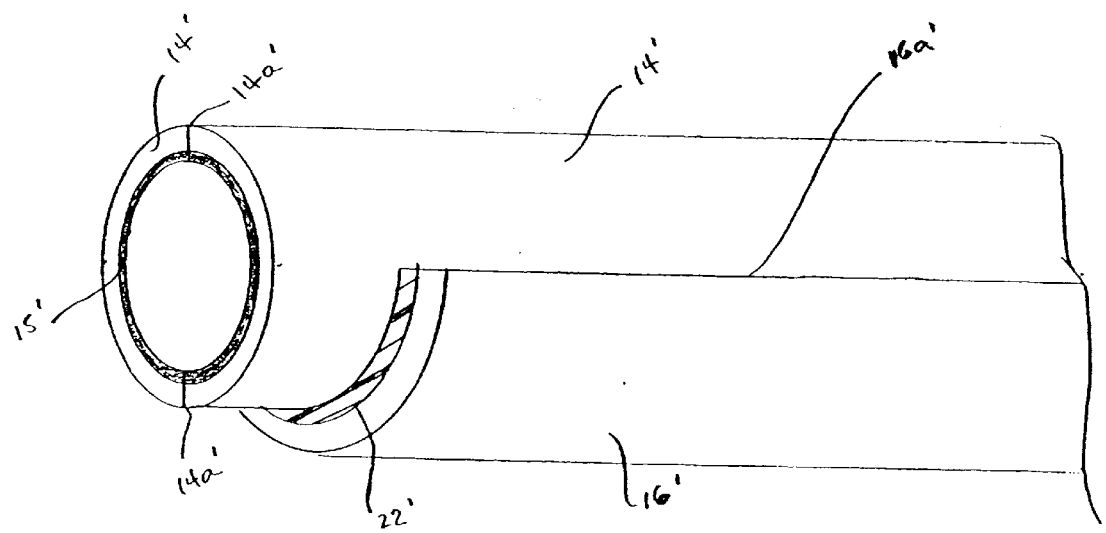
FIG. 7 is a side perspective view of an alternative assembly for the conduit of the present invention.
Figure 8:
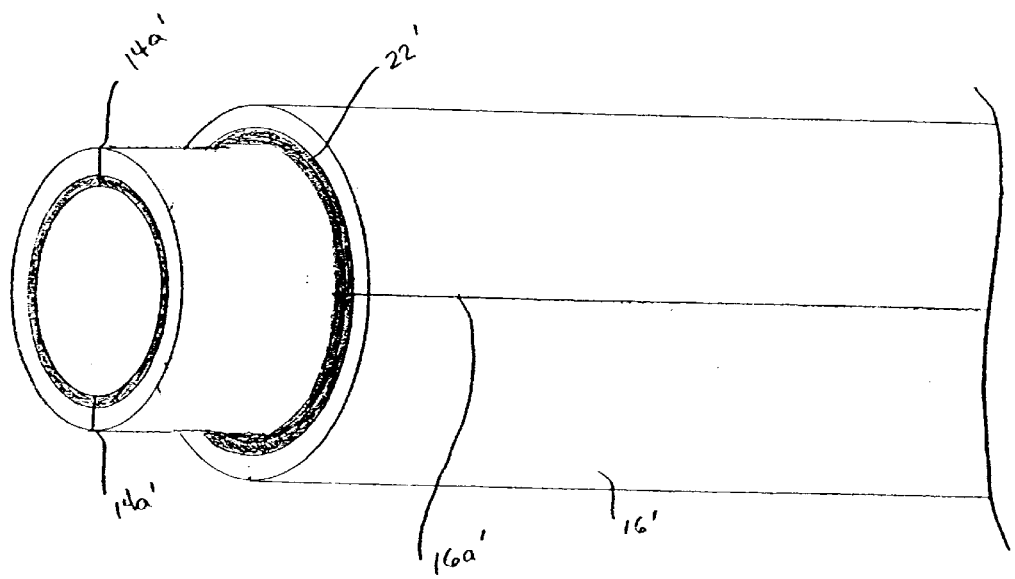
FIG. 8 is a side perspective view of an assembled conduit according to the alternative assembly shown in FIG. 7.

While FIGS. 4 through 6 are illustrative of one way to assemble the inner portions 14 and outer portions 16 to form a completed conduit according to the present invention, there are other equally suitable ways of assembling the inner portions 14 and outer portions 16 relative to one another. For example, as an added measure of leak prevention, the seams of the assembled inner conduit portions 14 are offset from the seams of the assembled outer conduit portions 16. As shown in FIGS. 7 and 8, the inner conduit portions 14' are assembled and adhered together so that seams 14a' are offset at about 90 degrees from the seams 16a' of outer conduit portions 16'. As those skilled in the art will appreciate, the offset can be much smaller (greater than zero degrees) than 90 degrees. Beyond the offset described herein, the final assembled conduit is the same in all other respects as the embodiments previously described. To assemble a conduit having offset seams, the vinyl ester resin layer is first applied to the inner surfaces of the two inner conduit half portions 14'. The two inner portions 14' are then adhered together to form a complete inner portion. Strips, or beads 22', of the vinyl ester resin are, as before, applied to the inner surface of the outer conduit portion 16'. The assembled inner conduit portions are seated in an outer conduit portion 16' so that the seams 14a' of the inner conduit portions are offset from the seams 16a' of the outer conduit portions. Beads of vinyl ester resin may be applied directly to the exposed portion of the inner conduit in preparation for seating the remaining outer conduit portion 16'. To complete the assembly, the remaining outer conduit portion 16' is seated and sealed to its counterpart outer portion along seams 16a'. Although not shown in FIGS. 7 and 8, an outer layer of vinyl ester resin is applied to the outer surface of the assembled conduit.

Figure 9:
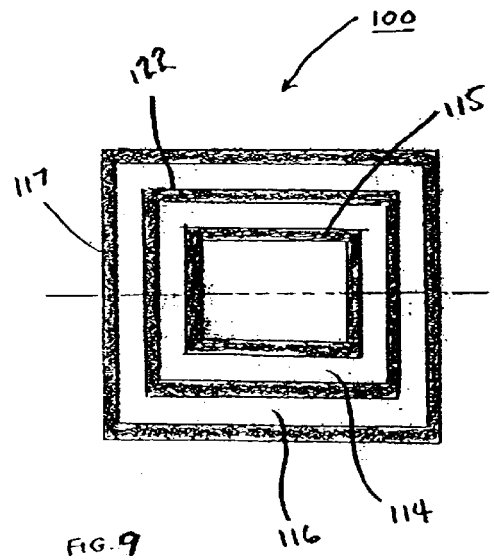
FIG. 9 is an end view of an alternative embodiment of the present invention formed as a rectangular ductwork.

While numerous shapes and sizes are possible, a second embodiment of the present invention is directed to a duct construction 100, with an end view of which is shown in FIG. 9. The duct 100 is formed in the equivalent manner as the circular conduit described above. Inner 114 and outer 116 duct portions are cut from the same blocks of rigid foam insulation as the semi-circular conduit portions. Strips 122 of vinyl ester resin are used to build up and seal the inner 114 and outer 116 duct portions. The duct portions are also aligned so that male extensions (not shown) and female ends (not shown) are created at opposite ends of each duct. A continuous inner layer 115 of vinyl ester resin is applied to the inner surface of inner portion 114, and a continuous outer layer 117 is applied to the assembled duct 100, following the attachment of two duct halves. In all other respects, the construction is equivalent to that of the circular conduit.

Figure 10:
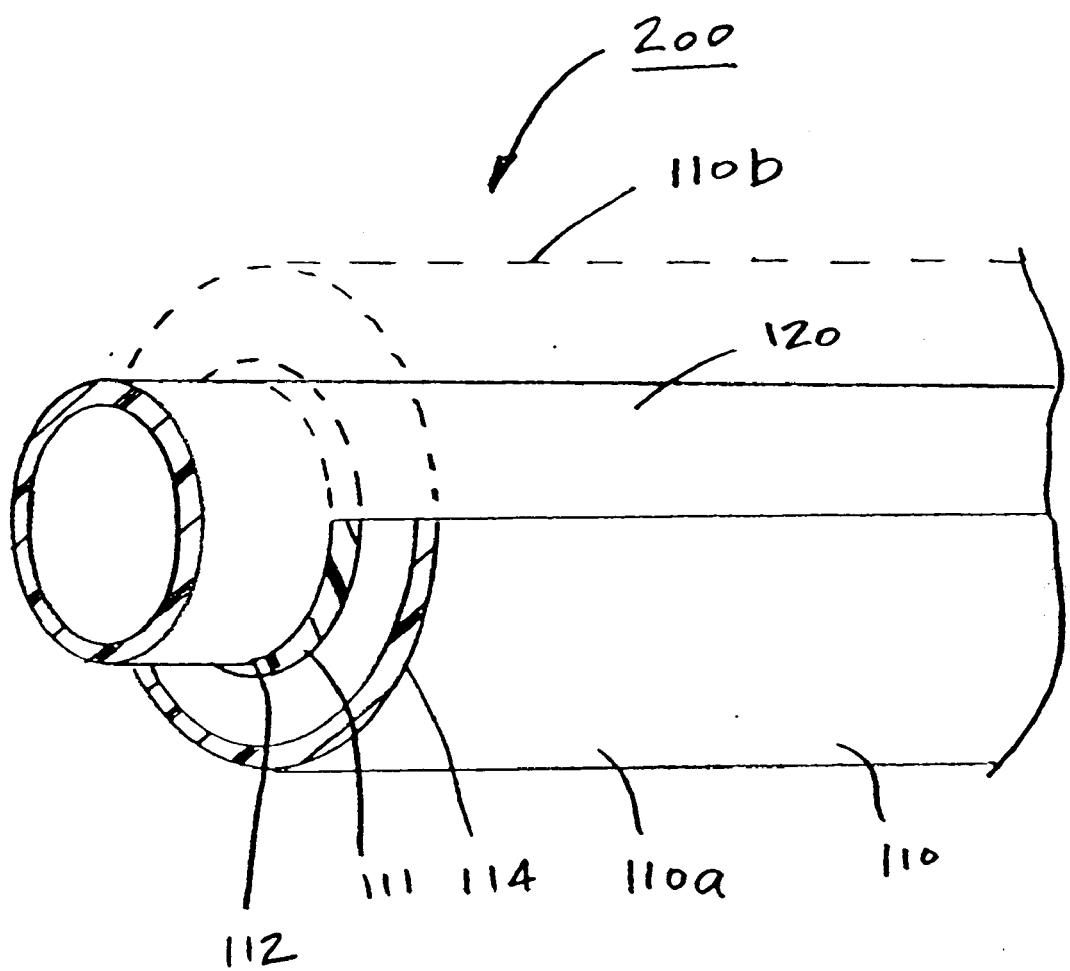
FIG. 10 is a side perspective view of an alternative embodiment with an outer conduit half section having a tubular resin liner positioned therein.

A further embodiment of the present invention is directed to a circular conduit construction having conduit half sections formed from unitary pieces of cut foam. A thin tubular-shaped resin liner provides an equivalent replacement for the inner corrosion-resistant coating of the embodiment described above. This construction has been found particularly desirable for "small bore" conduit, characterized herein as conduit with an inside diameter of less than about six inches, but may be used with conduit of much larger diameters. As illustrated in FIG. 10, a conduit 200 comprises an outer conduit portion 110 and an inner liner 120. The outer conduit portion 110 comprises two 180 degree semi-circular sections 110a, 110b of rigid foam insulation that are cut from lightweight foam billets as described above. In this embodiment, however, each outer conduit portion 110a, 110b has an overall wall thickness that is substantially equivalent to the combined wall thicknesses of the inner 14 and outer 16 conduit portions assembled together, as described above in the first embodiment.

Once the outer foam conduit sections have been cut, assembly of the lined conduit may proceed. FIG. 10 illustrates the construction of the lightweight conduit of this embodiment. A thin layer 112 of vinyl ester resin is applied to the inner surface 111 of conduit half 110a. The vinyl ester resin can be the same epoxy resin, VE-8301, described above in the first embodiment. With the epoxy resin 112 still uncured (wet), a tubular liner 120 of epoxy resin, having an outer diameter and length corresponding in dimension to the inner diameter and length of conduit portion 110a, is seated within the outer conduit portion 110a. The resin liner 120 protrudes outwardly beyond one end of the outer conduit 110a portion and is recessed into the opposite end of the outer conduit 110a an equal length. The inner resin liner 120 can be a fiber-reinforced thin tube of VE-8301 epoxy resin, manufactured by BTH Company, Inc. of Waxhaw, N.C. as Bondstrand Series 2000NS. Since the resin liner 120 comprises only the fiber-reinforced epoxy resin, may not itself be suitable for service as a permanent conduit. The liner 120 does, however, provide a convenient, equivalent replacement for a layer of VE-8301 applied, and cured, on a rigid foam conduit inner surface. The thickness of the liner is dependent upon the pipe diameter and the intended service. It has been found that forming a resin liner separately and securing it within the rigid foam conduit is a more cost-effective conduit construction for small-bore piping.

In this construction, the liner 120 itself forms the shiplap portions of the conduit 200 that was formed in the first embodiment by a separate inner foam conduit portion. Once the resin liner 120 has been secured within the first conduit half 110a, the second rigid foam conduit half 110b, with a thin layer of epoxy resin on its inner surface, is positioned over the first conduit half portion 110a to complete the conduit construction. When the thin layer of epoxy resin 112 has cured, the resin liner 120 is permanently bonded to conduit halves 110a, 110b to become an integral part of the finished conduit. A vinyl ester resin (VE-8301) coating 114 may be applied over the outer surface of the conduit construction so that the completed conduit has both inner and outer surfaces that are corrosion-resistant and flame-resistant.

Figure 11:
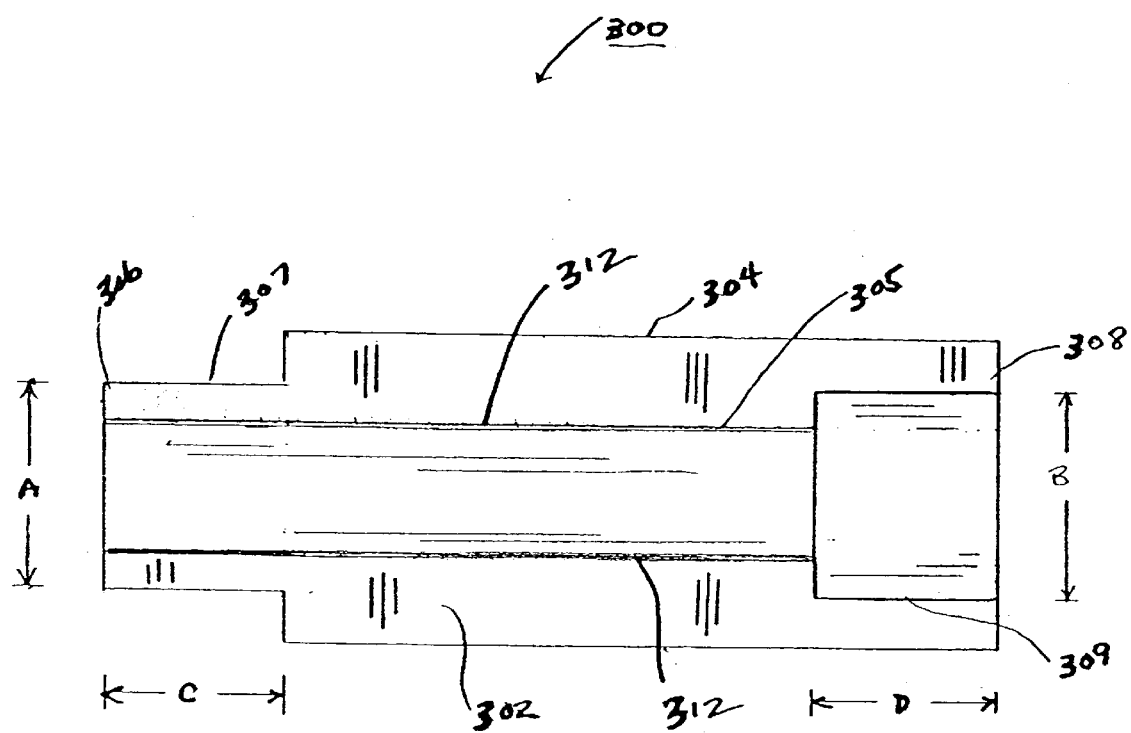
FIG. 11 is a side view of an alternative embodiment of a conduit half section formed from a singular piece of material.

A third embodiment of the present invention is a conduit construction wherein the total wall thickness is formed from a solid foam section instead of inner and outer portions; i.e., each conduit half section is a singular piece of rigid foam. Based on the American Society of Mechanical Engineers (ASME) Code, for example, piping having a nominal 1 inch wall thickness may have nominal inside diameters ranging from 1 inch to 18 inches, depending upon the application. The construction of such piping is shown in FIG. 11. As in the first embodiment of the present invention, 180 degree semi-circular sections 300 are cut from these lightweight billets; however, only a single semi-circular section is needed to form each conduit half section. When cut from the block of rigid foam, each half section will have an outer surface 304 and an inner surface 305, and first and second ends 306, 308. Any of a number of available cutting tools or saws may be used to form a male portion 307 extending from the first end 306. A semi-circular portion of the outer surface 304 is removed for a specified length (dependent upon the nominal outside pipe diameter). On the second end, a counter bore is cut to form a female portion 309. When the male 307 and female 309 portions are formed, they are so dimensioned that the outer diameter (dimension A) of the male portion 307 is approximately equal to the inner diameter (dimension B) of the female portion 309. Similarly, the length (dimension C) of the male portion 307 is equal to the length (dimension D) of the female portion. A coating of vinyl ester resin 312 is applied to the inner surface 305 of each conduit half section. When each of the half sections 300 of the lightweight conduit have been formed, they are aligned and adhered together in the same manner as the first embodiment of the present invention to form a complete circular conduit having a male end and a female end. A coating of vinyl ester resin (not shown) is applied to the outer surface 304 of the complete conduit as described above in the first embodiment.

Preliminary results of tests and experimentation conducted on an underground installation of conduit are favorable. A 12 inch pipe was emplaced as a drainage conduit beneath an unimproved (unpaved) construction driveway. Approximately 1 foot of clay cover was packed over the pipe to form the driveway. The performance of the pipe was carefully observed. In addition to the weight of the clay cover, multi-axle vehicles weighing in excess (gross weight) of 80,000 pounds utilized the driveway as a construction entrance. Not only did the pipe retain its structural rigidity, there was also no measurable change in cross section of the pipe due to this service.

Although the present invention has been described with preferred embodiments, it is to be understood that modifications and variations may be utilized without departing from the spirit and scope of the invention, as those skilled in the art will readily understand. Such modifications and variations are considered to be within the purview and scope of the appended claims and their equivalents.

We claim:

1. A lightweight conduit for fluid conveyance, comprising:
   (a) an outer conduit portion formed of rigid foam material, the outer conduit portion having an outer surface and an inner surface and first and second ends;
   (b) an inner conduit portion formed of rigid foam material, the inner conduit portion having an outer surface and an inner surface and first and second ends, the outer surface substantially conforming to the inner surface of the outer conduit portion;
   (c) the inner and outer conduit portions being aligned and adhered together wherein the first end of the inner conduit portion protrudes outwardly beyond the first end of the outer conduit portion, and the second end of the inner conduit portion is recessed into the second end of the outer conduit portion; and
   (d) a protective coating on the inner surface of the inner conduit portion wherein the coated inner surface defines an interface for fluid conveyance.

2. The conduit of claim 1 further including a corrosion-resistant and flame-resistant coating on the outer surface of the outer conduit portion.

3. The conduit of claim 1 wherein the rigid foam is selected from the group of materials consisting of polymerized polyurethane, modified polyisocyanurate, and rigid cellular plastic.

4. The conduit of claim 1 wherein the conduit is substantially round in cross-section.

5. The conduit of claim 1 wherein the conduit is substantially rectangular in cross-section.

6. The conduit of claim 1 wherein the inner and outer portions of the conduit are attached with an adhesive selected from the group of adhesives consisting of mastic and vinyl ester resin.

7. The conduit of claim 1 wherein the coating applied to the inner surface of the inner panel is vinyl ester resin.

8. The conduit of claim 7 wherein the vinyl ester resin minimizes moisture migration and corrosive intrusion through the inner and outer portions of the conduit.

9. A lighlweighlt conduit for fluid conveyance, comprising:
   (a) two conduit half sections, each of said half sections having:
      (i) an outer portion formed of rigid foam, the outer portion having an outer surface and an inner surface and first and second ends;
      (ii) an inner portion formed of rigid foam, the inner portion having an outer surface and an inner surface and first and second ends, the outer surface substantially conforming in dimension to the inner surface of the outer portion;
      (iii) the inner surface of the outer portion and the outer surface of the inner portion being aligned and adhered together, and wherein the first end of the inner conduit portion protrudes outwardly beyond the first end of the outer conduit portion, the second end of the inner conduit portion being recessed into the second end of the outer conduit portion;
      (iv) a protective coating on the inner surface of the inner conduit portion wherein the coated inner surface defines an interface for fluid conveyance; and
   (b) wherein the two half sections are attached together to form a complete conduit.

10. The conduit of claim 9 further including a corrosion-resistant and flame-resistant coating on the outer surface of the outer conduit portion.

11. The conduit of claim 9 wherein the rigid foam is selected from the group of materials consisting of polymerized polyurethane, modified polyisocyanurate, and rigid cellular plastic.

12. The conduit of claim 9 wherein the conduit is substantially round in cross-section.

13. The conduit of claim 9 wherein the conduit is substantially rectangular in cross-section.

14. The conduit of claim 9 wherein the inner and outer portions of the conduit are attached with an adhesive selected from the group of adhesives consisting of mastic and vinyl ester resin.

15. The conduit of claim 9 wherein the coating applied to the inner surface of the inner conduit portion is vinyl ester resin.

16. The conduit of claim 15 wherein the vinyl ester resin minimizes moisture migration and corrosive intrusion through the inner and outer portions of the conduit.

17. A lightweight conduit for fluid conveyance, comprising:
   (a) two conduit half sections, each half section formed of rigid foam and having:
      (i) an outer surface and an inner surface, and first and second ends;
      (ii) a male portion extending outward from the first end, the male portion having an inner surface and an outer surface;
      (iii) a female portion recessed inward from the second end, the female portion having an inner surface and an outer surface, and wherein the inner surface of the female portion conforms in dimension to the outer surface of the male portion;
      (iv) a protective coating on the inner surface of each conduit half section wherein the coated inner surface defines an interface for fluid conveyance; and
   (b) wherein the two half sections are attached together to form a complete conduit.

18. The conduit of claim 17 further including a resin coating on the outer surface of each conduit half section, wherein the lightweight conduit is flame-resistant and minimizes moisture migration and corrosive intrusion through the outer surface.

19. The conduit of claim 17 wherein the rigid foam is selected from the group of materials consisting of polymerized polyurethane, modified polyisocyanurate, and rigid cellular plastic.

20. The conduit of claim 17 wherein the conduit is substantially round in cross-section.

21. The conduit of claim 17 wherein the conduit is substantially rectangular in cross-section.

22. The conduit of claim 17 wherein the resin coating minimizes moisture migration and corrosive intrusion through the inner surface of each conduit half section.

23. A lightweight conduit for fluid conveyance, comprising:
   (a) an outer conduit portion formed from a plurality of pieces of rigid foam material assembled together, the outer conduit portion having an outer surface and an inner surface and first and second ends;
   (b) an inner conduit portion formed from a plurality of pieces of rigid foam material assembled together, the inner conduit portion having an outer surface and inner surface and first and second ends, the outer surface substantially conforming to the inner surface of the outer conduit portion;
   (c) the inner and outer conduit portions being aligned and adhered together wherein the first end of the inner conduit portion protrudes outwardly beyond the first end of the outer conduit portion, and the second end of the inner conduit portion is recessed into the second end of the outer conduit portion; and
   d) a protective coating on the inner surface of the inner conduit portion wherein the coated inner surface defines an interface for fluid conveyance.

24. The conduit of claim 23 further including a corrosion-resistant and flame-resistant coating on the outer surface of the outer conduit portion, wherein the coating further minimizes moisture migration and corrosive intrusion through the conduit surfaces.

25. The conduit of claim 23 wherein the rigid foam is selected from the group of materials consisting of polymerized polyurethane, modified polyisocyanurate, and rigid cellular plastic.

26. The conduit of claim 23 wherein the conduit is substantially round in cross-section.

27. The conduit of claim 23 wherein the inner and outer portions of the conduit are assembled and attached with an adhesive selected from the group of adhesives consisting of mastic and vinyl ester resin.

28. The conduit of claim 23 wherein the coating applied to the inner surface of the inner panel is vinyl ester resin.

29. A lightweight conduit for fluid conveyance, comprising:
   (a) an outer conduit portion formed of rigid foam material, the outer conduit portion having an outer surface and an inner surface and first and second ends;
   (b) an inner liner portion formed of corrosion-resistant and flame-resistant resin, the inner liner portion having an outer surface and an inner surface and first and second ends, the outer surface substantially conforming to the inner surface of the outer conduit portion, wherein the inner surface of the inner liner portion defines an interface for fluid conveyance; and
   (c) the inner liner and outer conduit portions being aligned and adhered together wherein the first end of the inner liner portion protrudes outwardly beyond the first end of the outer conduit portion, and the second end of the inner conduit portion is recessed into the second end of the outer conduit portion.

30. The conduit of claim 29 further including a flame-resistant resin coating on the outer surface of the outer conduit portion, wherein the coating further minimizes moisture migration and corrosive intrusion through the outer surface.

31. The conduit of claim 29 wherein the rigid foam is selected from the group of materials consisting of polymerized polyurethane, modified polyisocyanurate, and rigid cellular plastic.

32. The conduit of claim 29 wherein the conduit is substantially round in cross-section.

33. The conduit of claim 29 wherein the inner liner and outer portion of the conduit are attached with an adhesive selected from the group of adhesives consisting of mastic and vinyl ester resin.

* * * * *